United States Patent [19]
Edwards

[11] 3,854,514
[45] Dec. 17, 1974

[54] TIRE CHAIN CARRIERS

[76] Inventor: Ralph R. Edwards, 1 Haymount Ter., Briar Cliff Manor, N.Y.

[22] Filed: Nov. 16, 1972

[21] Appl. No.: 307,238

[52] U.S. Cl. ............................................... 152/233
[51] Int. Cl. ............................................ B60c 27/02
[58] Field of Search ........... 152/233, 213, 232, 236, 152/237, 216, 221

[56] References Cited
UNITED STATES PATENTS

| | | | |
|---|---|---|---|
| 2,344,972 | 3/1964 | Copp | 152/233 |
| 2,457,060 | 12/1948 | Peterson | 152/237 |
| 2,976,904 | 3/1961 | Cameron | 152/237 |
| 3,481,384 | 12/1969 | Triglia | 152/233 |

*Primary Examiner*—James B. Marbert
*Attorney, Agent, or Firm*—Philip Furgang

[57] ABSTRACT

Disclosed are chain carriers for motor vehicles. One carrier comprises at least a hook member positioned against the convex wall of a Bud-type wheel and a strap engaging member positioned against the concave wall. The two members are joined together by means of bolts passing through a hand hole of the wheel. A plurality of such carriers are positioned so that the wheel is in balance. A second carrier comprises a hook member on the top or upper surface of a spacer rim and a strap engaging member is on the bottom or lower surface. The two members are secured to the rim and the strap engaging member extends between the spokes of a spoke-type dual wheel assembly. A plurality of such carriers are spaced about the rim so that the wheel is in balance.

12 Claims, 8 Drawing Figures

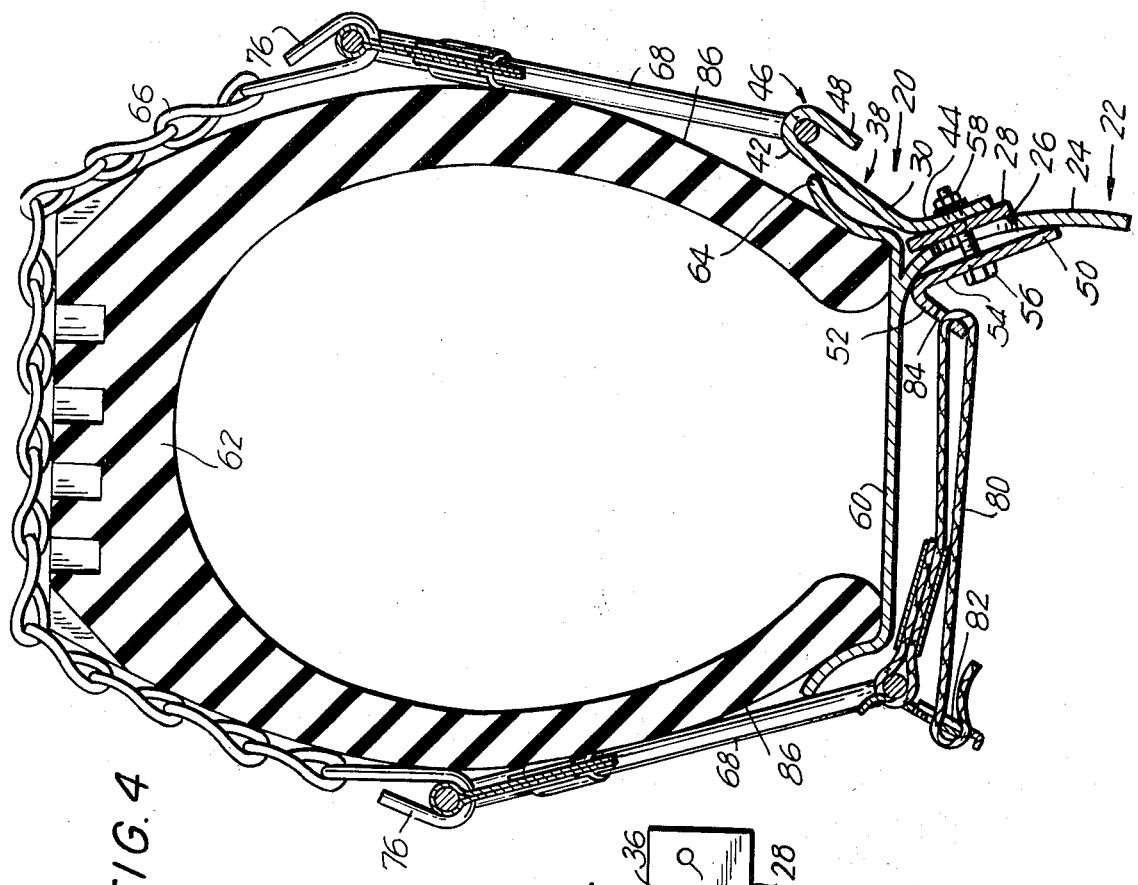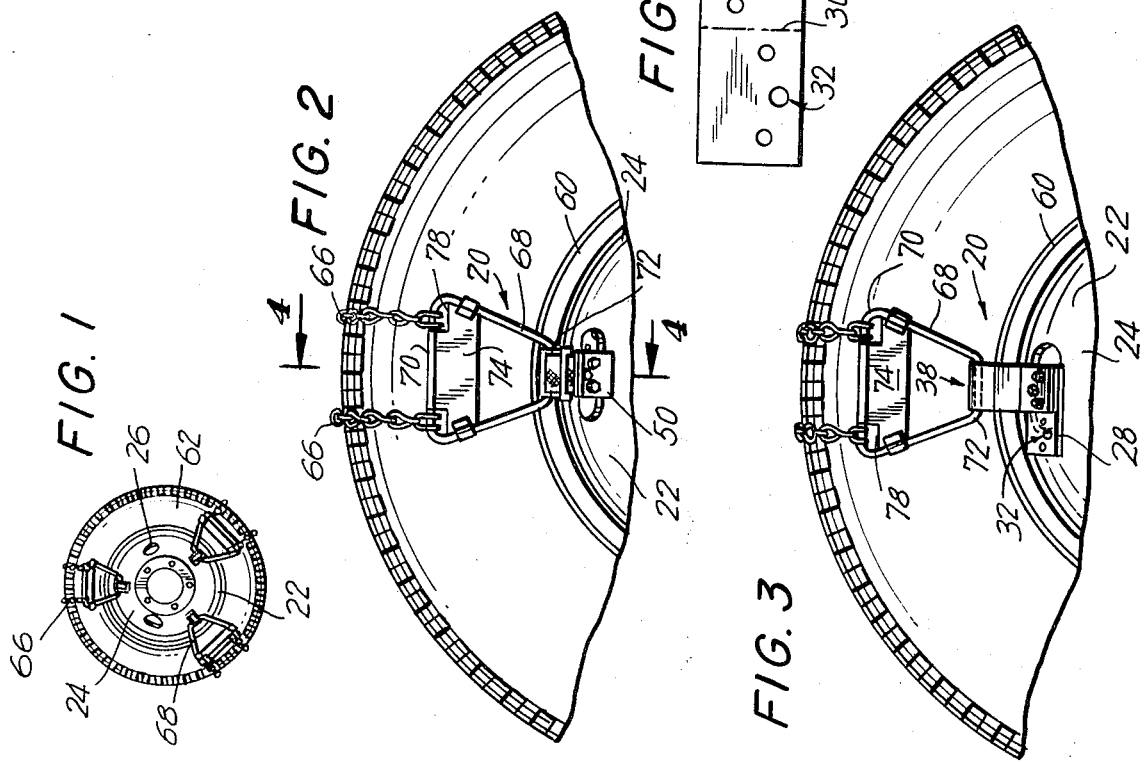

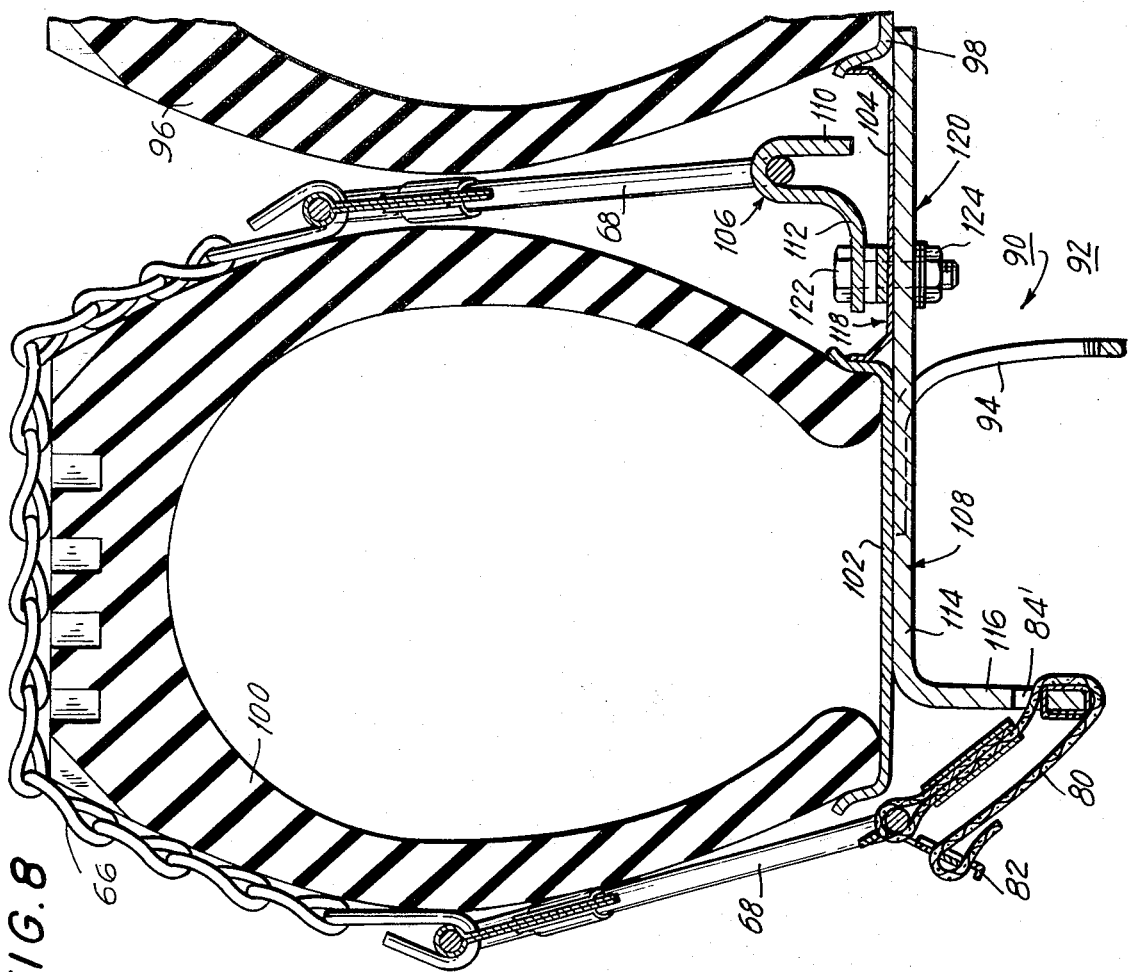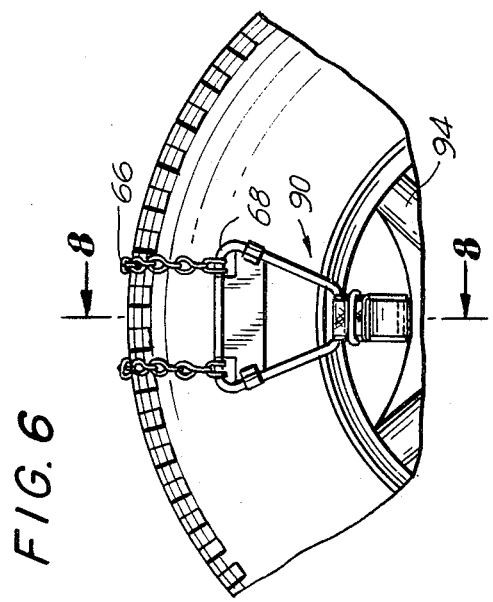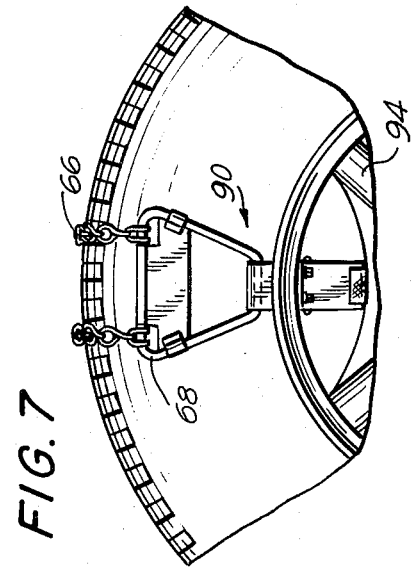

TIRE CHAIN CARRIERS

BACKGROUND OF THE INVENTION

This invention relates to chain carriers for motor vehicles and more particularly to means for carrying or holding snow chains about motor vehicle tires.

For almost as long as there has been widespread use of motor vehicles, chains have been proposed to assist such vehicles in movement through snow, mud, and the like. For approximately the same period of time there have been a number of suggested devices for attaching such chains to the vehicle wheels. Such devices have, however, suffered from a number of disadvantages.

In general, so-called permanent chains require many time-consuming and mechanically inconvenient tasks to install. Chain carriers for permanent chains are attached to wheels by means of lengthy procedures which often include jacking up the vehicle, removal of the wheel, and specialized equipment. Chains of this type are intended for long distances.

On the other hand, temporary chains are used for short distances. Chains of this type are intended for quick installation in emergency situations. However, carriers for such chains are frequently flimsy and, as the term implies, temporary or unable to withstand long usage. Such chain carriers are not as effective as the permanent carriers.

One example of a suggested permanent snow chain carrier installation is provided by Triglia in U.S. Pat. No. 3,481,384. Triglia provides a disk-shaped plate which is secured to the vehicle drum. The plate has legs which extend inwardly with respect to the vehicle. The legs are provided with hook ends. The tire-bearing wheel is then installed upon the plate and hub. Clips are then placed on the exterior part of the wheel and the entire assembly of clip, wheel, and plate is secured to the drum by special shank bolts. The snow chains are then provided with a strap at one end for engaging the clip end and a hook at the other end for engaging the hook end of the leg.

It is immediately obvious that installations of this type are exceedingly complicated, timely, and — therefore — costly. Initial installation of the chain carrier requires the jacking up of the vehicle, removal of the wheel, and the use of specially designed lugs.

Another suggested device is provided by Winkelspecht in U.S. Pat. No. 3,091,274. Winkelspecht proposes spring-loaded chains joined to a hook. The hook is welded to the rim of the wheel. The opposed side or end of the chains are joined to a spring which is, in turn, clipped onto a ring. The ring "floats" or is held in place by the equal forces of a plurality of symmetrically disposed chains. As the wheel rotates and the tire deforms on contact with the pavement, the ring will move throwing the wheel out of balance. In addition, in order to affix the chains to the ring, there is required a complicated balancing as the ring is pulled into place.

Still another concept has been suggested by Kane in U.S. Pat. Nos. 2,624,388 and 2,652,091. Kane provides a spacer rim to be placed between a dual tire configuration. A rack, with the teeth thereof directed toward the axis of the wheel, extends through an aperture in the spacer. The rack is spaced below the rim of the exterior wheel and tire and is parallel the wheel axis. A locking member or bar engages the rack teeth. Secured to the rack and the bar are opposite ends of snow chains. The required aperture in the spacer is disadvantageous in manufacture and use. In addition, the spacing of the rack from the rim permits the chains to flex undesirably as the rack gives under pressure of the rotating tire. The locking bar is placed under the rim, making installation difficult since it must be manuevered between the rim and the rack. The forces of the tire, transmitted to the chains, are in turn imposed upon the teeth of the rack, making the teeth a likely area of mechanical failure. The breaking of the teeth will make the carrier inoperative.

A further suggested device is proposed by Jeup in U.S. Pat. No. 1,565,095. There, a pair of rings on opposite sides of a wheel are concentric to the wheel and secured to one another by bolts passing through spaces between spokes. One of the rings has a plurality of hooks spaced about to engage opposite sides of snow chains. One obvious disadvantage to this device is that the rings cann shift under the pressure of the flexing tire, and throw the tire out of balance. Installation would require the removal of the entire wheel assembly from the hub.

Still another suggested device is provided by Stuller in U.S. Pat. No. 2,006,659. Stuller suggests snow chains loosely carried upon a wheel. One of the links of the snow chain passes through apertures of two plates. The two plates are on opposite sides of the wheel and over hand holes. Such an arrangement does not hold chains firmly in place. Thus, the chains tend to move about the tire and circumferentially thereby failing to provide the desired traction and having a reduced life.

SUMMARY OF THE INVENTION

It is an object of this invention to provide snow chain carriers that are easily installed.

It is a further object of this invention to provide snow chain carriers which are economic in manufacture and simple and convenient in use.

It is another object of this invention to provide snow chain carriers which may be used for temporary or permanent snow chain installations.

It is still another object of this invention to provide snow chain carriers which may be easily balanced.

It is still a further object of this invention to provide snow chain carriers for Bud-type wheels which may be installed without removing the wheel from the vehicle or jacking up the vehicle.

In accordance with the teachings of this invention, there is provided a snow chain carrier for a vehicle wheel. The carrier is intended to be placed upon a wheel of the type having a spoke body. The carrier comprises spacer rim means, strap engaging means, and hook engaging means. The spacer rim means is of the type supported by the spokes and is held in place by an exterior tire and rim. The strap engaging means is secured to the spacer rim means and is adapted to extend between the spokes and the exterior rim. When installed, the strap engaging means abuts the exterior tire supporting rim. The hook means is secured to the spacer rim means and is adapted to engage one end of snow chains. The strap engaging means is adapted to engage the other end of the snow chains such that when installed upon the hub with the exterior tire and rim, snow chains can be installed and engage the tread of the exterior tire.

In another aspect of this invention, the vehicle wheel is of the type having a bowl-shaped body portion. The body portion has hand holes spaced about the periphery thereof. In this embodiment, the hook engaging means is adapted to engage the exterior, convex portion of the bowl and extend across at least a part of one of the hand holes. The strap engaging means is adapted to abut the interior, concave portion of the bowl and extend across at least a portion of the hand hole. Securing means are provided and are adapted to pass through the hand hole and rigidly secure the hook engaging means and strap engaging means to the bowl.

BRIEF DESCRIPTION OF THE DRAWING

FIG. 1 is a front plan view of a plurality of chain carriers each constructed in accordance with the teachings of this invention and assembled upon a tire and engaging snow chains;

FIG. 2 is a partial and enlarged view of the snow chain and carrier assembly of FIG. 1;

FIG. 3 is a partial and enlarged view of the assembly of FIG. 1 taken from the rear;

FIG. 4 is a partial sectional view of the assembly of FIG. 2 taken along lines 4—4;

FIG. 5 is a front plan view of a support plate constructed in accordance with the teachings of this invention;

FIG. 6 is a partial front plan view of another snow chain carrier assembled upon a tire with snow chains and constructed in accordance with the teachings of this invention;

FIG. 7 is a partial rear plan view of the assembly of FIG. 6; and

FIG. 8 is a partial sectional view of the assembly of FIG. 6 taken along the lines 8—8.

DESCRIPTION OF THE PREFERRED EMBODIMENTS

Turning now the drawing, there is disclosed (FIGS. 1 - 5) a snow chain carrier 20 for a motor vehicle wheel and tire. The wheel 22 disclosed in connection with this embodiment is of a Bud-type construction. Bud-type wheels 22 generally have a disk-like body portion 24. In another aspect, the body portion 24 may be regarded synonymously as being generally bowl-shaped. Spaced about the bowl-shaped body portion 24 may be one or more apertures or hand holes 26.

The snow chain carrier 20 may comprise a support plate 28 (most clearly seen in FIG. 5). The support plate 28 may be bent at a slight angle to conform to the convex exterior curvature of the bowl 24. The support plate 28 may, in this regard, have a single bend 30 or a plurality (not shown). The plate 28, as with other members of the chain carrier 20, may be made of a heavy gauge steel or other structural material capable of withstanding the forces exerted by the tires and snow chains.

The plate 28 may have therein a plurality of apertures 32. As disclosed (FIG. 5), these apertures 32 may be arranged as the apieces of an imaginary triangle (not indicated), with two small apertures 34 disposed on either side of a larger aperture 36. The set of apertures 32 may be disposed, as indicated, on both sides of the bend 30 or substantially in the center. The function of a set of apertures 32 will be more fully discussed below.

A hook member 38 is provided. In this embodiment, the hook member 38 has a lower, substantially rectangular body portion 40 which is bent sharply upwards, approximating an L-shaped configuration. The longer leg 42 may be disposed at an obtuse angle with respect to the shorter leg 44. The end of the longer leg 42 is surmounted by a hook portion 46 with the shorter lip 48 of the hook extending inwardly, within the L-shaped body portion 40. The short leg 44 of the hook member 38 may have therein a plurality of apertures (not shown) having the same general configuration as the apertures 32 of the plate 28.

A strap engaging member 50 is provided as a part of the carrier 20. The strap engaging member 50 is a generally L-shaped member. The included angle between the shore and long leg 52 and 54, respectively, of the member 50 may be, for example, acute. The long leg 54 of the strap member 50 may have disposed therein apertures (not shown) having substantially the same size and configuration as the apertures 32 of the plate 28.

Bolts 56 may be provided as securing means for assembly of the carrier 20 upon the wheel 22. In the alternative, the carrier may be secured by such other means as interlocking portions of the plate 28, strap engaging member 50, and hook member 38.

In assembly, the plate 28 and strap engaging member 50 are placed on opposite sides of the bowl 24 and across a hand hole 26. The strap engaging member 50 may be arranged with the juncture of the two legs 52 and 54 adjacent the lip of the bowl 24. The bolts 56 maY be inserted through the apertures 32 in the strap engaging member 50, plate 28, and hook member 38 and secured by nuts 58 in a manner well known in the art. The nuts 58 on respective bolts 56 may be disposed with the nuts 58 on either the interior or exterior side of the bowl 24. The plate 28 is so dimensioned that it covers a substantial portion of the hand hole 26, thereby preventing the force on the carrier 20 from pulling the parts thereof through the hand hole 26. It is essential that the carrier 20 be secured firmly to the wheel 22 to prevent the snow chain from moving about the tire thereby reducing the desired gripping ability and shortening its work life.

Wheels 22 of the type most suitable for this embodiment are, as has been indicated, of the Bud-type with the rim 60 formed as an integral part of the body portion 24. Any well known rim 60 construction may be employed. A tire 62 of any suitable design may be disposed upon the rim 60 in any known manner (shown in FIG. 4 is a tubless tire). The hook member 38 is disposed with the long leg 42 thereof abutting an upwardly extending lip 64 of the rim 60.

Snow chains 66 of any conventional design may be employed. As disclosed, the snow chain 66 are arranged in parallel pairs of chains and secured, at opposite ends, to trapazoidally shaped hooks 68 made of a continuous rod-like member. Each trapazoidal hook 68 is fo a conventional design, having parallel top and bottom mmbers 70 and 72, respectively. The bottom member 72 is of shorter length than the top member 70. The top of the trapazoidal hook 68 may be strengthened by, for example, a reinforcing bar or plate 74 secured to the top member 70 and side members 74. The snow chains 66 may be secured to the trapazoidal hooks 68 at the top member 70 by, for example, closing or encircling the top member 68 with a link 76 of the chain 66. The support plate 74 may serve, by — for example — suitably disposed cut outs 78 to locate and hold apart the snow chains 66.

A strap 80 having a buckle 82 may be secured to the bottom, rod-like member 72 of the trapazoidal hook 68.

The carrier 20 may be secured to the wheel 22 while it is mounted upon a vehicle (not shown). Generally, such wheels 22 are used on trucks, buses, and the like. In many circumstances, the Bud-type wheels are disposed in a dual wheel arrangement. In this or a single wheel vehicle, it is a simple matter to engage the hook member 38 between two wheels and draw the chains 66 across the tire 62 and tighten securely with the strap 80 in the strap engaging member 50. Clearly, the plate 28, hook 38, and strap engaging member 50 may be secured to the wheel 22 without jacking up the vehicle or removing the wheel 22. It is also possible to use this device as a permanent installation.

The short leg 52 of the L-shaped strap engaging member 50 has a slot 84 therein. In use, the strap 80 is inserted through the slot 84 and held tightly by the buckle 82. The trapazoidal hooks 68 are so disposed as to rest against the side walls 86 of the tire 62. The forces transmitted by the chains 66 are communicated to the hook 46 and lip 64 at one end and the strap 80 trapazoidal hook 68 and rim 60 at the other end. The strap 80 may be made of any cloth material, such as a cotton duck webbing, to withstand and yet give under the forces exerted by the chains 66.

For short distances it is possible to attach but one carrier 20 and chains 66. However, for any distance, it is desirable to have a wheel 22 with at least three hand holes 26 (one hand hole 26 is usually reserved for the valve stem [not shown] and cannot hold a carrier 20). As previously indicated, the apertures 32 are arranged so that the carrier 20 can be located for proper balancing of the tires 62. Thus, two bolts 56 are used and the third bolt hole 34 is so arranged such that the carrier 20 may be unused so be placed at one end or the other of the hand hole 26. The larger bolt hole is intended to withstand the greater forces.

The parts of the carrier 20 may be formed, for example, of one-quarter inch steel. The larger aperture 36 may have, for example, a diameter of one-half inch and the smaller apertures 34 a diameter of three-eights of an inch.

It is understood that the angles of the plate 28, strap engaging member 50 and the hook member 38 are selected for optimum direction of the forces exerted by the tire on the chains. However, any other arrangement, emboding these elements may be used.

Turning now to another embodiment, there is disclosed (FIGS. 6 - 8) a carrier 90 particularly suitable for dual wheel vehicles that use spoke type body portions. In discussing this embodiment, identical or primed reference numerals are used herein to indicate the same or related parts already disclosed in connection with the first embodiment.

There is disclosed (FIG. 8) a portion of a wheel 92 having a spoke body portion 94. In such a wheel 92, as is commonly known, the drum (not shown) has extending therefrom spokes 94. In assembling such a dual tire arrangement, the first tire 96 and rim 98 are placed upon the spokes 94. A spacer rim is then placed on the spokes 94. A second or exterior tire 100 mounted upon a rim 102 is secured in placy by a shim (not shown) bolted to the spokes 94.

The spacer rim 104 os this invention is of a well known configuration and made of any well known material such as steel. Secured at regular intervals about the cylindrically shaped spacer rim 104 are hooks and strap arms 106 and 104, respectively. Each hook 106 may have a substantially U-shaped hook end 110 with a laterally extending arm 112. The arm 112 has at least two bolt holes (not visible) which are in registry with similar bolt holes (not visible) in the rim 104.

The strap arm 108 may be substantially L-shaped with the long leg 114 of the arm 108 having bolt holes (not visible) at the free end for alignment and registry with the bolt holes in the rim 104. The downwardly extending shorter leg 116 of the arm 108 may have a strap engagin slot 84'. The hook 106 is secured to the upper surface 118 of the spacer 104 with the hook end 110 extending toward the first tire 96. The strap arm 108 is secured to the lower surface 120 of the rim 104. Thus, the hook 106 and arm 108 are secured by at least two bolts 122 (one is shown) and nuts 124. Clearly, any other means of securing the two parts 106 and 108, such as welding, may be employed.

Each of the arms 106 extends outwardly from the rim 104 and is parallel the vehicle axial. The arm 108 terminates with the downwardly extending leg 116 at a point before the marginal outer edge of the second tire bearing rim 102.

In the device disclosed herein, snow chains 66, trapazoidal hooks 68, and strap 80 and buckle 82 may be used in the same manner as disclosed in connection with the first-mentioned embodiment (FIGS. 1–5). The regular arrangement of the arms 108 assures that the tire 100 will not be out of balance. In installation, the arms 108 pass beetween the spokes 94. It is not considered essential that the arms by symetrically disposed in the space between the spokes 94. The arms 108 abut the rim 102 so that forces exerted by the chains 66 are withstood by the arms 106 and the rim 102, thereby imparting greater load bearing strength to the carrier 90. In addition, the abutting relationship of the arms 106 to the rim 102 assures that there will be no undesirable vibration, particularly with the chains 66 removed from the tire 100.

It is clear that the carrier 90 of this invention is most suitable for dual spoke-type wheels, while the previous carrier 20 may be employed on either single or dual wheels. In the latter device, the bowl 24 faces inwardly.

What is claimed is:

1. A snow chain carrier for a vehicle wheel, the vehicle wheel being of the type having a bowl-shaped body portion, the bowl having hand holes spaced at regular intervals thereabout, said chain carrier comprising:
   a. hook engaging means adapted for:
      extending across at least a portion of one of the hand holes on one side of the bowl, and
      engaging the hook end of a snow chain;
   b. strap engaging means adapted for:
      extending across at least a portion of the hand hold on the opposed side of the bowl, and
      engaging the strap end of snow chains; and
   c. securing means adapted for:
      extending through the hand hole, and
      rigidly securing said hook engaging means and strap engaging means to opposed sides of the bowl.

2. A snow chain carrier as recited in claim 1 wherein said hook engaging means is adapted for substantially conforming to the convex wall of the bowl and
said strap engaging means is adapted to abut the concave wall of the bowl.

3. A snow chain carrier as recited in claim 2 wherein said hook engaging means comprises at least a substantially L-shaped member one leg of which is adapted to engage the hook end of the snow chains.

4. A snow chain carrier as recited in claim 3 wherein said strap engaging means comprises an L-shaped member the longer leg of which abuts the concave wall of the bowl, the shorter leg comprises means for engaging the strap end of a snow chain.

5. A snow chain carrier as recited in claim 4 wherein said securing means comprises means for locating said carrier upon the bowl such that upon disposing at least two of said carriers upon the wheel each of said carriers is positionable within the hand hole said securing means passes so that the wheel is in balance.

6. A snow chain carrier as recited in claim 5 wherein said securing means comprises at least two nut and bolt sets, said bolts passing through the hand hole and securing said strap engaging means and said hook engaging means to the wheel, said locating means comprises said strap engaging means and hook engaging means having a plurality of bolt holes so that said carrier is positionable within and about the hand hole.

7. A snow chain carrier as recited in claim 6 wherein:

said hook engaging means comprises a support plate and a hook member, said hook member being said L-shaped member with the included angle between the legs being obtuse, one of said legs being disposed against said support plate and the other of said legs terminating in a hook and positionable against the wheel rim,
said L-shaped strap engaging means having an includes acute angle, said means for engaging a strap comprising said short leg having a slot therein for receiving a strap, said strap engaging means being oriented such that said long leg abuts said concave bowl wall and said short leg being disposed adjacent said rim and extending downwardly with respect thereto to receive the strap end of a snow chain.

8. A chain carrier for a vehicle wheel, the vehicle wheel being of the type having a spoke body for engaging and supporting an interior tire supporting rim, a spacer rim, and an exterior tire supporting rim, said carrier comprising:

a. spacer rim means capable of being supported by the spokes,
disposed between the interior and exterior tire, and
secured upon the wheel by the exterior tire supporting rim;
b. member means for engaging a strap secured to said spacer rim means and adapted for extending from said spacer rim and between the spokes, abutting the outer tire supporting rim, and having means to engage one end of the snow chains; and
c. hook engaging means secured to said spacer rim means between the exterior and interior tires and adapted for engaging the opposed end of the snow chains.

9. A chain carrier as recited in claim 8 wherein said member means comprises an L-shaped arm secured to said spacer rim means and extending parallel to the axis of said spacer rim means,
said hook engaging means comprises a U-shaped hook member and a laterally extending mounting arm extending from the free end of one of the legs of said U.

10. A chain carrier as recited in claim 9 wherein said spacer rim means comprises a spacer rim,
said L- shaped arm having the long leg secured to the interior wall of said spacer rim and adapted for abuting the exterior tire supporting rim, the short leg of said L-shaped arm extends downwardly from said long leg and within the exterior tire supporting rim,
said lateral arm being secured to said spacer rim such that said hook has the opening thereof so disposed such that the snow chain mounted upon the exterior tire cannot pull outwardly thereof.

11. A chain barrier as recited in claim 10 wherein said short leg of said L-shaped member having a slot therein for receiving the strap end of a snow chain and
said U-shaped hook being so disposed such that the snow chain applies a force directly to said free end of said U-shaped hook having said laterally extending arm.

12. A chain carrier as recited in claim 11 further comprises
a plurality of said arms and said hooks secured to said spacer rim at equal distances about the circumference thereof, each one of said hooks being secured to one of said arms and said spacer rim.

* * * * *